(No Model.) 6 Sheets—Sheet 1.

T. DUNCAN.
ELECTRIC METER.

No. 604,463. Patented May 24, 1898.

Witnesses
Frank L. Sessions
Samuel R. Bachtel

Thomas Duncan Inventor
By his Attorneys Chapin & Denny (No Model.)  6 Sheets—Sheet 2.

T. DUNCAN.
ELECTRIC METER.

No. 604,463.  Patented May 24, 1898.

Witnesses
Frank L. Sessions,
Samuel R. Bachtel.

Thomas Duncan Inventor
By his Attorneys Chapin & Denny (No Model.) 6 Sheets—Sheet 4.

T. DUNCAN.
ELECTRIC METER.

No. 604,463. Patented May 24, 1898.

Witnesses
Frank L. Sessions
Samuel R. Bachtel

Thomas Duncan Inventor
By his Attorneys Chapin & Denny (No Model.) 6 Sheets—Sheet 5.
T. DUNCAN.
ELECTRIC METER.
No. 604,463. Patented May 24, 1898.
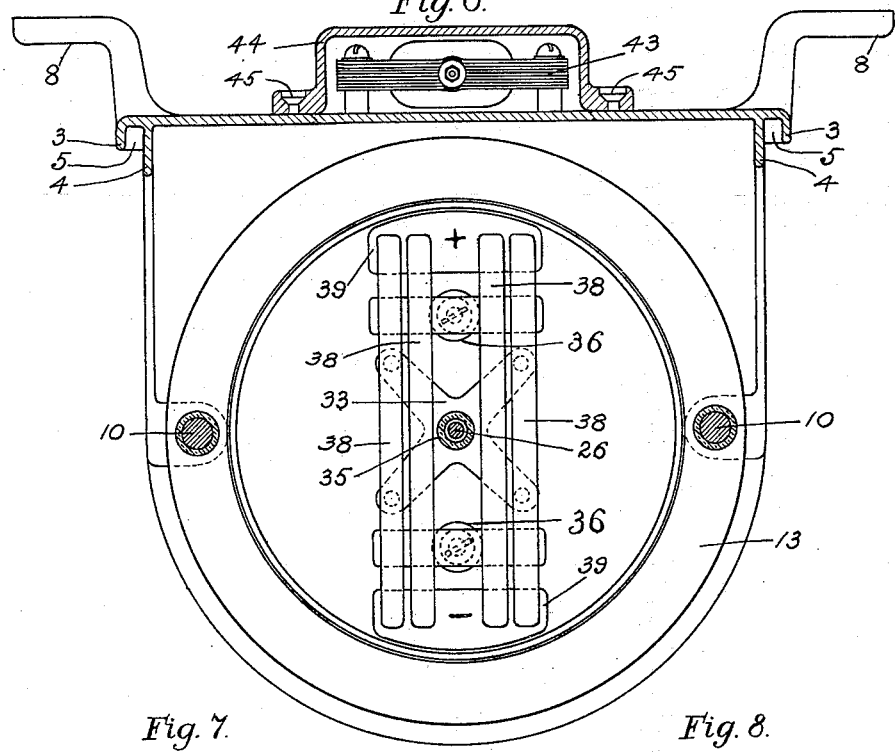
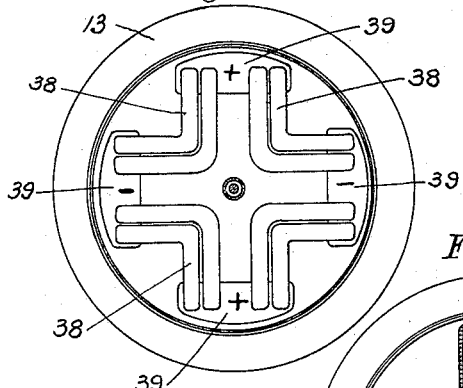
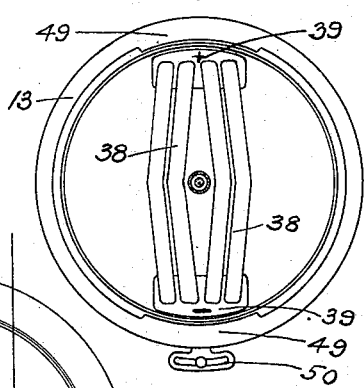
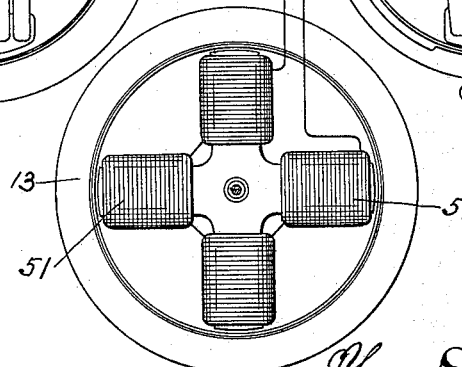
Witnesses
Frank L. Sessions,
Samuel R. Bachtel.
Thomas Duncan Inventor
By his Attorneys Chapin & Denny (No Model.) 6 Sheets—Sheet 6.

T. DUNCAN.
ELECTRIC METER.

No. 604,463. Patented May 24, 1898.

Witnesses
Frank L. Sessions
Samuel R. Bachtel

Thomas Duncan Inventor
By his Attorneys Chapin & Denny

UNITED STATES PATENT OFFICE.

THOMAS DUNCAN, OF FORT WAYNE, INDIANA.

ELECTRIC METER.

SPECIFICATION forming part of Letters Patent No. 604,463, dated May 24, 1898.

Application filed August 26, 1897. Serial No. 649,558. (No model.)

*To all whom it may concern:*

Be it known that I, THOMAS DUNCAN, a citizen of the United States, residing at Fort Wayne, in the county of Allen, in the State of Indiana, have invented certain new and useful Improvements in Electric Meters; and I do hereby declare that the following is a full, clear, and exact description of the invention, which will enable others skilled in the art to which it appertains to make and use the same, reference being had to the accompanying drawings, which form part of this specification.

My invention relates to improvements in electric motor-meters, particularly to that class known as "integrating watt-hour meters" for measuring the energy consumed in lighting or motor service with alternating currents.

The object of my invention is to provide an electric meter of the class described of simple and economical construction that can be easily taken apart for repairs and readily and quickly assembled and installed, absolutely dust and insect proof, having such an arrangement of motive parts as to give a maximum torque and electrical efficiency with a minimum absorption of electrical energy, and adapted to integrate with accuracy on all loads, and provided with a new and improved means of retardation, and having an improved motive part.

The principal novel features of my invention are the arrangement of the motive part of the meter, the improved means of retardation, the improved form of armature, and the means for adjustably securing the same in position for use.

Figure 1:
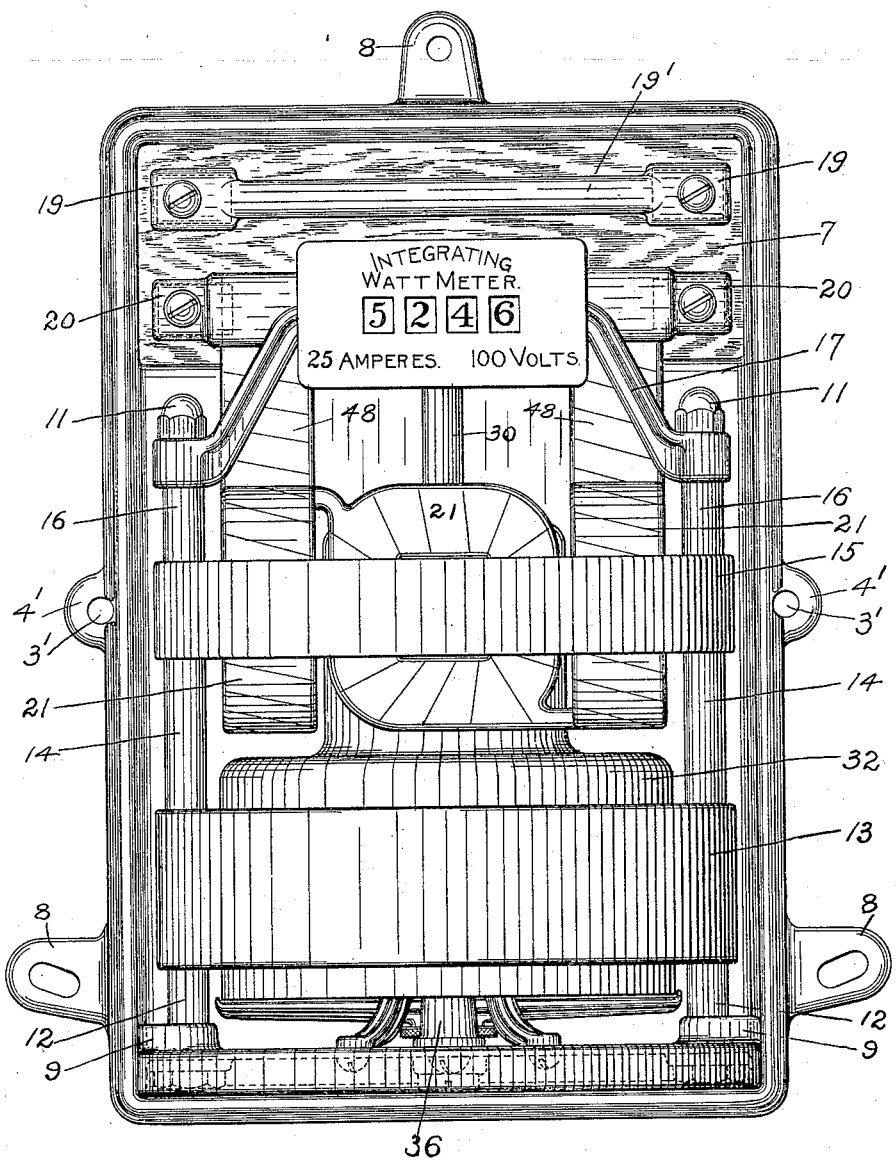
Figure 2:
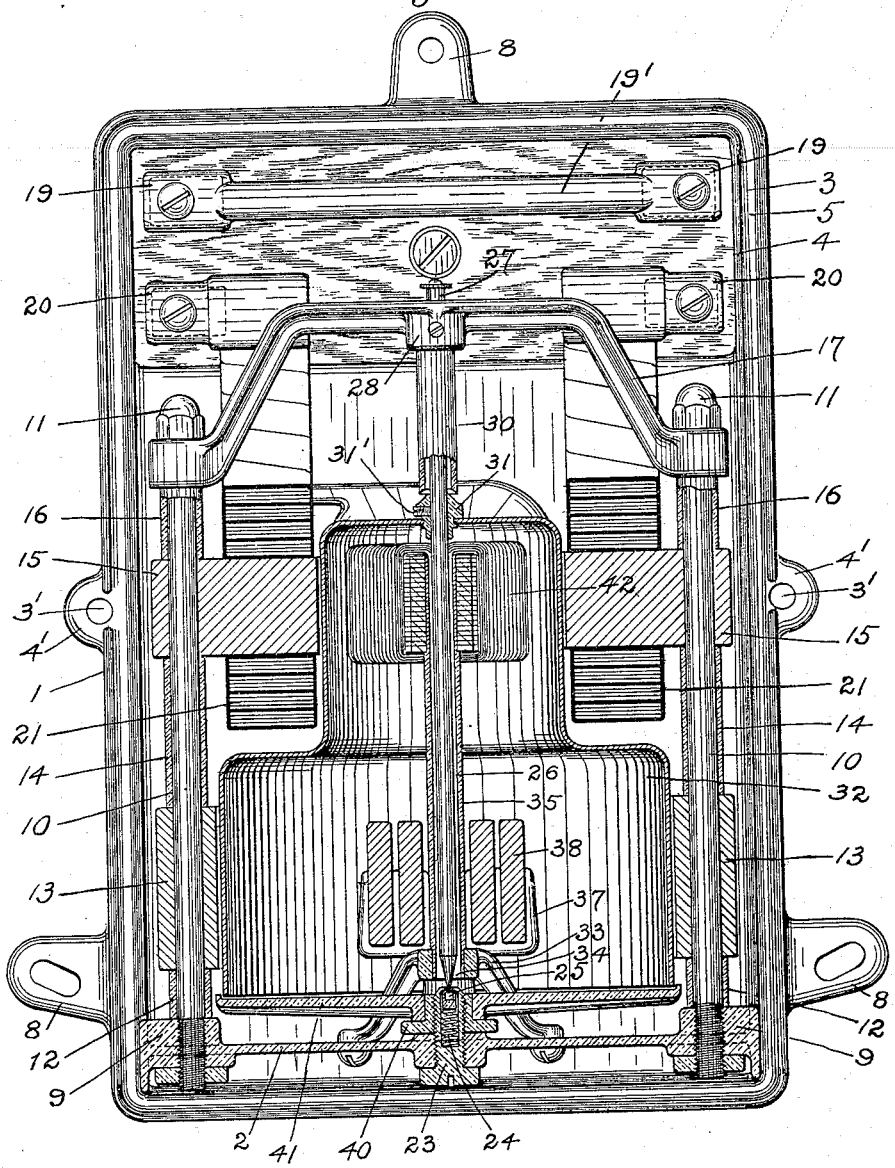
Figure 3:
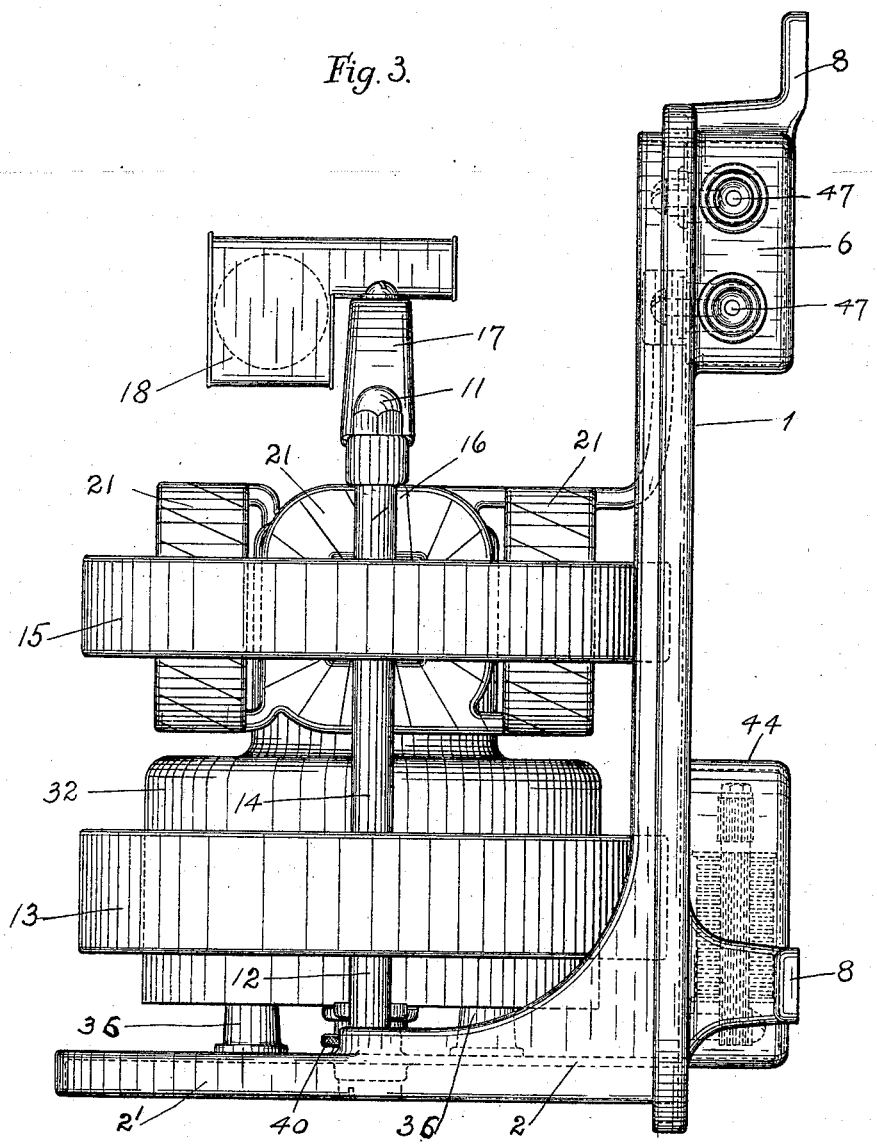
Figure 4:
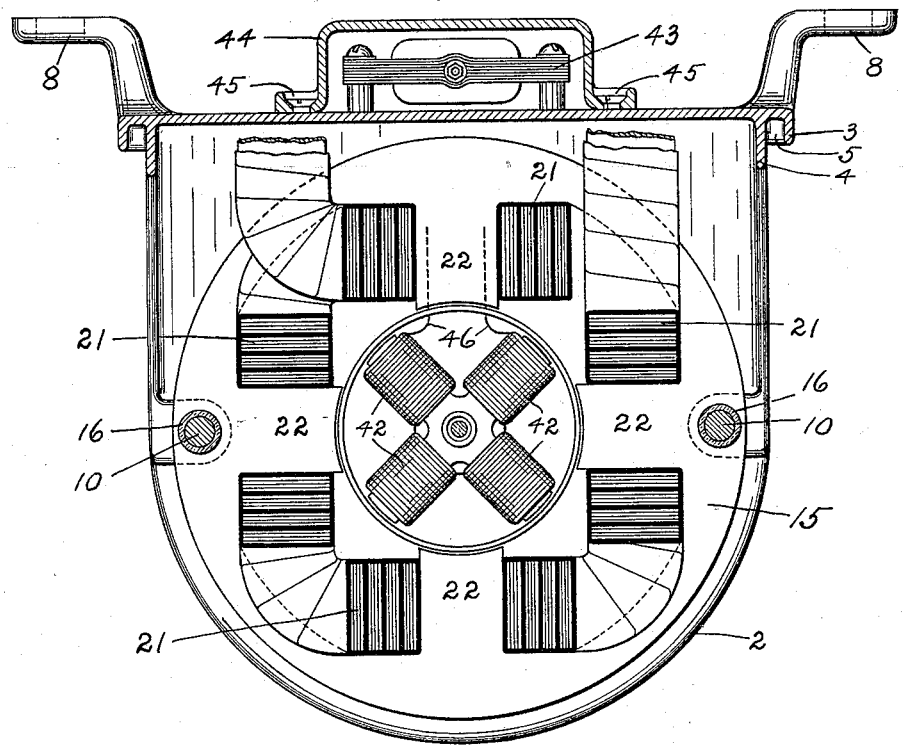
Figure 5:
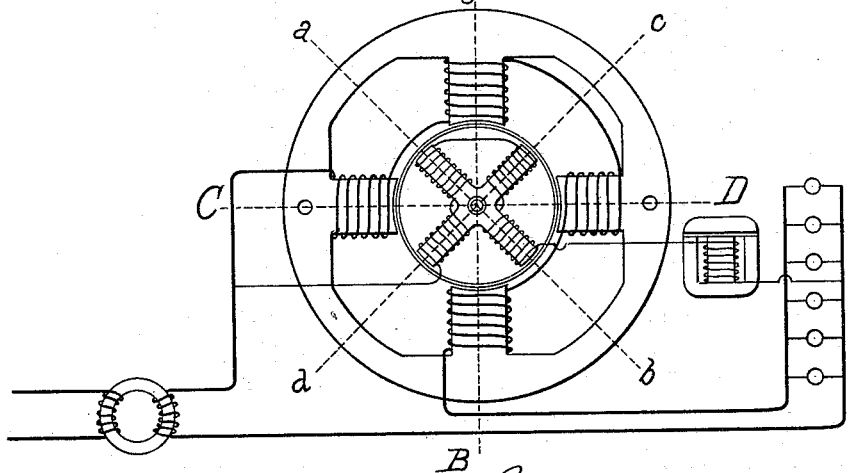
Figure 10:
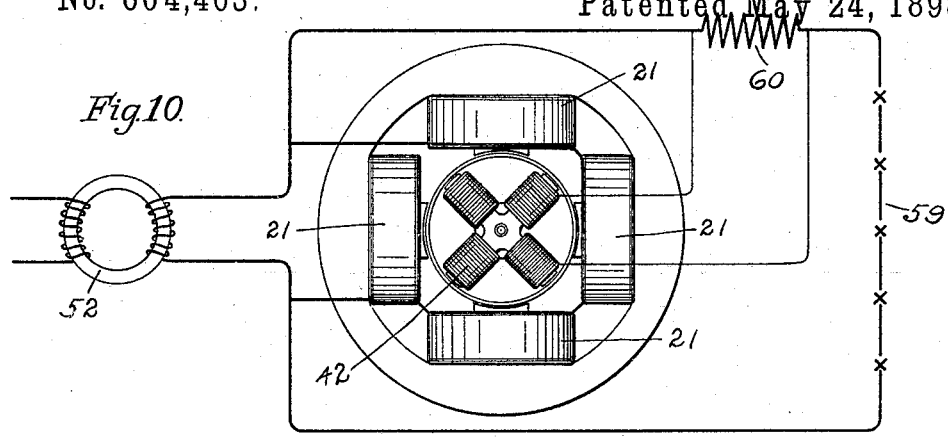
Figure 11:
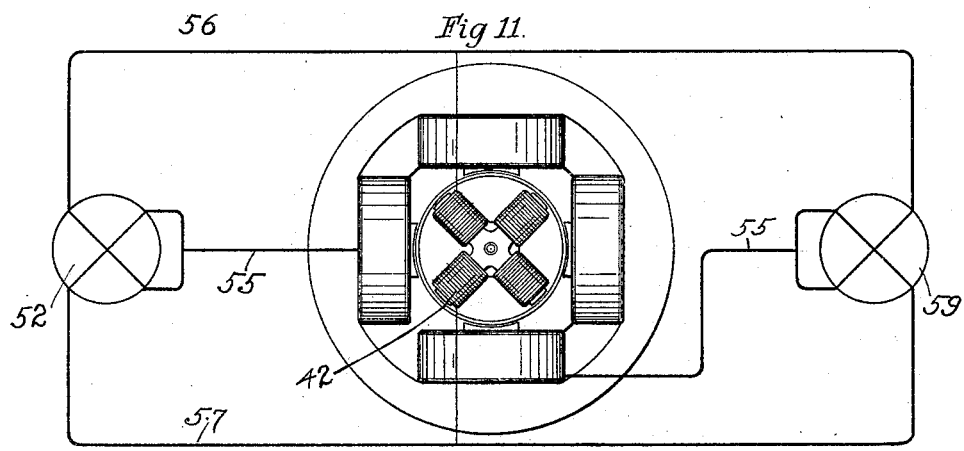
Figure 12:
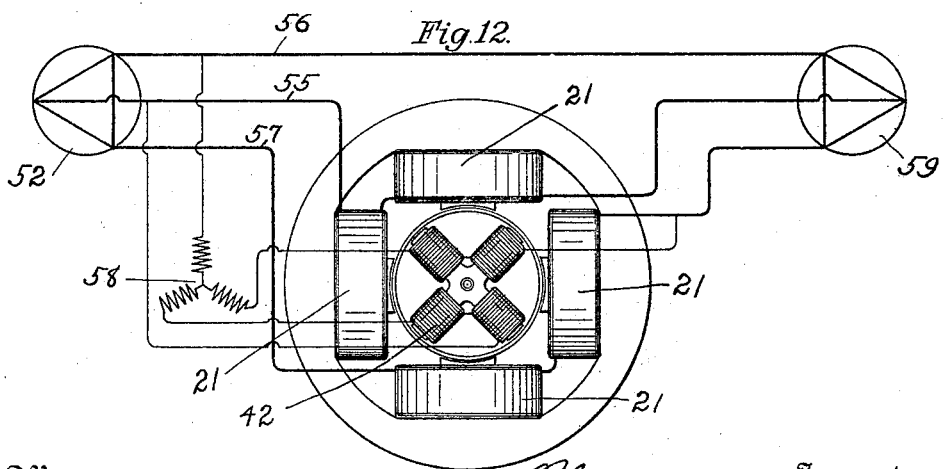

In the accompanying drawings, Figure 1 is a front elevation of my improvement, showing the relative arrangement of the operative parts. Fig. 2 is a vertical section of the same, showing the arrangement of the volt-coils and the retarding-magnets within the cylindrical armature and also showing the means for securing the armature in position. Fig. 3 is a side elevation of my improvement. Fig. 4 is a transverse section of the same through the series coils and the upper contracted portion of the motive part and also through the shield for the impedance-coil. Fig. 5 is a diagrammatic view illustrating the application of my improvement to a single-phase system of distribution. Fig. 6 is a transverse section through the retarding part of the apparatus, showing the arrangement of the permanent magnets within the enlarged basal portion of the cylindrical armature. Figs. 7, 8, and 9 are modified forms of the retarding device. Fig. 10 is a diagrammatic view of my improvement applied to the measurement of the energy in a constant current and variable potential circuit. Fig. 11 is a diagrammatic view of the same applied to a two-phase system of distribution. Fig. 12 is a diagrammatic view of the same applied to a three-phase system of distribution.

The metallic bracket 1, on which my improved meter is detachably mounted, has a solid back, Fig. 4, and an integral forwardly-projecting base 2, arranged at right angles thereto and provided upon its upper edge with a continuous vertical flange 2', on which the operative parts are arranged, Fig. 3. The back of said bracket is provided upon its edges with the continuous parallel flanges 3 and 4, forming a continuous recess 5, Fig. 1, adapted to snugly receive the edges of a proper dust and insect proof cover, (not shown,) which is firmly held in position by proper pins or pivoted latches thereon adapted to be inserted in the holes 3' on the lateral lug 4' of said bracket, after which they are secured therein by proper seal-nuts in a well-understood manner.

The bracket 1 is provided near the top thereof with a transverse integral pocket 6, Fig. 3, open upon its front face and adapted to contain and secure the wooden insulating-block 7, and is provided with the apertured feet 8, by which it is fixed to the wall when in use. At the sides of the base 2 of said bracket and upon both faces thereof are provided a thickened portion 9, having a screw-threaded perforation, in which are mounted the lower screw-threaded ends of the upright posts 10, whose upper end is also screw-threaded for the cap-nuts 11. On the said posts 10, adjacent to the said portions 9, are arranged the short sleeves 12, adapted to support the iron ring 13, having opposite vertical perforations to loosely receive the said posts, Figs. 2 and 6. On said posts are arranged the loose sleeves 14, with their lower end resting upon said ring 13 and adapted to support the annular block 15, which in turn supports a third pair of loosely-fitting sleeves 16 on the posts 10, adapted to support the yoke 17, which is adapted to support the registering-train 18, Fig. 3, and which is rigidly secured in position by the cap-nuts 11. The upper binding-posts 19 are united by the cast bar 19′, mounted, as shown, on the block 7 and connected with the line-wires. (Not shown.) The lower binding-posts 20 are connected to the two terminals or ends of the series coils 21. The annular block 15 is provided with two pairs of diametrically opposite polar extensions 22, upon which the series coils 21 are mounted and supported. In a proper screw-threaded opening in the base 2 of said bracket is mounted the screw 23, Fig. 2, having a central bore at its upper end, in which is arranged a spiral spring 24, adapted to support a jewel-bearing 25, in which the lower pointed end of the armature shaft or spindle 26 is mounted, the upper end 27 being mounted in a proper opening midway the ends of said yoke 17 and forming a proper bearing therein. In a pendent boss 28 on said yoke about the said shaft-opening is rigidly suspended, by means of a proper set-screw, the centering-tube 30, inclosing the upper portion of said armature-shaft and having its lower end beveled to receive the tapering adjacent end of the casting 31, slidably mounted on said spindle and adapted to be fixed thereon in any desired adjustment by means of the set-screw 31′. The rotatable armature 32, preferably of aluminium, consists of a cylinder closed at the top and open at the bottom and having its lower portion of a considerably-increased diameter for the purpose hereinafter described. The armature thus constructed is rigidly fixed upon and suspended from the lower portion of said casting 31. The chair 33, rigidly fixed to said base 2 by proper holding-screws, Fig. 2, has a central opening 34, in which is fixed, by soldering or other proper manner, the lower end of the upright tube 35, loosely inclosing the lower portion of said spindle and arranged concentric therewith. At proper points on the base 2 of said bracket 1 are arranged the vertical studs 36, Figs. 1, 3, and 6, on the tops of which are fixed the clamps 37, adapted to support the opposite ends of the permanent magnets 38, having their ends pressed tightly into iron pole-pieces 39, thereby giving them the advantages of a compound magnet. On the screw 23 is mounted the thumb-nut 40, having an annular supporting-flange upon its lower end for the spider, which is loosely mounted thereon and is adapted to elevate the armature by rotating said thumb-nut until the tapering upper end of said casting 31 is pressed firmly in contact with the beveled lower end of the said centering-tube 30, whereby the lower conical end of the armature-spindle will be firmly held out of contact with said jewel-bearing, as for transportation and the like, and the armature will be firmly held between the said tube 30 and the said spider. The volt-coils 42 are wound upon a cross-shaped laminated core, which is rigidly held in position by being slipped over and tightly mounted upon the top of the said tube 35, which is rigidly supported in a concentric relation to the spindle by having its lower end soldered into the chair 33, as described.

A proper impedance-coil 43, Figs. 4 and 6, is arranged upon the outer face of the bracket-back and is tightly incased by a cast hood or covering, which is secured to said back by the screws 45. The terminals 46 of the volt-coils are connected with the said impedance-coil and with the leading-in terminals of the meter in a well-understood manner, as shown diagrammatically in Fig. 5. The registering-train 18 is connected with the armature-spindle by means of a worm upon the adjacent end of said spindle, adapted to mesh with a gear-wheel in said train in the usual manner. The said annular support 15 may be made of any suitable material. When my improved meter is employed in measuring the energy supplied to motors or other inductive loads, the said support 15 is preferably made of wood. Where it is employed for incandescent lamps or other non-inductive loads, it is preferably made of laminated iron, thereby reducing the number of turns in the series coils necessary to secure the same density of flux.

The operation of my improvement thus described is obvious, and, briefly stated, is as follows: The current enters the binding-posts 19 and 20 through the insulated openings 47 in the said pocket 6, and by means of the leads 48 enters the series coils 21, which are wound with copper strips instead of wire, thereby setting up two lines of magnetization A B and C D, which bisect the armature at right angles to each other, Fig. 5, and whose strength is proportional to the current strength in the series coils. As the axes of the volt-coils within the armature are inclined to the axes of the field-coils and the volt-coils have their terminals so connected with the two mains as to receive the current in proportion to the pressure of the system, it is obvious that the four volt-coils will also produce corresponding lines of magnetization $ab$ and $cd$, Fig. 5, at right angles to each other and inclined to the said lines of magnetization A B and C D, and that if these four intersecting lines of magnetization are synchronous the resulting eddy currents in the cylindrical armature will have no effect in producing rotation thereof. If, however, there be a difference of phase between the current passing through the field-coils 21 and that passing through the said volt-coils, shifting fields will be produced by the described intersection of the lines or axes of magnetization, which set the armature in rotation. I secure this difference in phase by connecting the said impedance-coil in series with the said volt-coils, thereby causing the current in the volt-coils to lag behind that in the series coils. This causes first an impulse of current in the series coils, with their resulting intersecting lines of magnetization A B and C D. Then immediately follows an impulse of current in the volt-coils, with their said resulting lines of magnetization $ab$ and $cd$, which will increase in value when those in the series coils are decreasing, whereby shifting magnetic fields are established between the said lines adapted to induce actuating-currents in the armature. In other words, an impulse of current in the work-circuit traversing the series coils sets up the two lines of magnetization A B and C D. As these lines are dying out the lines of magnetization $ab$ and $cd$ are set up by the volt-coils, which lines attract the said lines A B and C D of the series coils, respectively, thereby producing shifting magnetic fields adapted to rotate the armature by cutting through the same.

By employing a plurality of coils both within and without the armature—that is, four poles upon the outside and four poles upon the inside of the armature or other multiple of two—I secure an increased torque for a given amount of energy, and the armature is actuated by said shifting fields with a force equal to the watts delivered to the translating devices.

To secure speed of revolution in the armature proportional to the watts, the lower portion of the armature is enlarged, increasing the peripheral speed of said portion and of the rate of cutting the lines of force emanating from the pole-pieces 39, Fig. 6, of the compound magnet 38 as they pass through the armature to the said iron ring 13. This cutting of the said lines of force by the rotation of the armature develops or induces eddy currents therein which are proportional to its speed of rotation, thereby producing a damping effect upon the armature which is proportional to the watts passing through the meter and giving a resulting speed exactly proportional to the energy being consumed in the translating devices. The said ring 13 is adapted to attract and conduct the lines of force from one pole of the retarding-magnets 38 to the other, and thereby producing a very strong field. This ring also shields the said magnets from the action of the earth's magnetism, and thus enables them to preserve their standard strength against interference by any external field. This ring may be provided with inwardly-projecting poles 49, Fig. 8, whereby a variation in the retardation or drag of said armature may be secured by an adjustment of the permanent magnets 38 by means of the operating-lever 50. The permanent magnets 38 may be bent into an L shape, thus giving them a multipolar construction, Fig. 7. If desired, an electromagnet 51 may be substituted for the said permanent magnets, as shown in Fig. 9.

In Fig. 10 is shown a diagrammatic view of my invention as applied for measuring the energy in a constant current and a variable potential circuit, in which case the series coils 21 are connected in shunt or multiple on the circuit, thereby causing the current through them to vary as the electromotive force at the terminals of the generator 52. The current supplying the volt-coils 42 is received from the terminals of the resistance 60, over which the drop will vary directly as the current supplying the lamps at 50. Thus the energy consumed by said lamps may be accurately measured.

In Fig. 11 is shown my meter applied to a two-phase system of distribution, in which the field-coils 21 are connected in series in the common return-line 55, while the volt-coils 42 are connected across the two outer lines or leads 56 and 57.

In Fig. 12 my improvement is applied to a three-phase system, in which the series coils are connected into the two leads 55 and 57, and the volt-coils 42 are energized by a small three-phase transformer 58.

What I desire to secure by Letters Patent is—

1. In a motor-meter, a revoluble metallic armature, and a series of field-coils without said armature whose adjacent poles are in close proximity thereto, and in such relation that the resulting intersecting lines of magnetization are at right angles to each other; in combination with an equal number of volt-coils located within the armature whose lines of magnetization are inclined to the said lines of magnetization of the field-coils, for the purpose specified.

2. In a motor-meter, a revoluble aluminium armature having its reduced upper end adapted to inclose the volt-coils; two pairs of series coils without the said armature whose lines of magnetization bisect the armature and intersect each other at right angles; in combination with two pairs of volt-coils located within the armature whose poles are equal in number to the series coils and whose lines of magnetization intersect the said lines of magnetization of the field-coils; and means for retarding the said lines of magnetization of the volt-coils.

3. The process herein described of producing rotation in a revoluble metallic armature for motor-meters, which consists in setting up four or more intersecting lines of magnetization bisecting said armature by alternating electric currents differing in phase, thereby producing a shifting magnetic field about said armature adapted to actuate the same.

4. In an electric meter, a plurality of energizing-coils connected in series in the main line and conveying the current to be measured; a plurality of energizing-coils supplied with current from the mains in parallel and representing the electromotive force of the system; and an impedance-coil in series with said volt-coils; in combination with a revoluble metallic armature of low electrical resistance arranged between the two series of energizing-coils as described; and a proper totalizing mechanism.

5. In a motor-meter of the class described a rotatable metallic armature having a contracted upper portion for the motive part of the meter and an enlarged lower portion for the retarding mechanism; a series of field-coils without said contracted portion of the armature; a series of volt-coils within said armature and adjacent to the field-coils; a fixed iron ring 13 embracing said armature out of contact therewith for the purpose specified; and a permanent magnet or magnets arranged within the enlarged portion of the armature for the purpose of increasing its retardation, all substantially as described.

6. In a motor-meter the metallic frame 1 having a marginal groove and aperture lateral ears for the purpose specified; a pair of upright supporting-posts 10 for the motive parts; a yoke 17 surmounted on said posts as shown; the upright tube 35 fixed as shown in a supporting-chair and adapted to rigidly support the volt-coils; the armature-spindle 26 rotatably mounted in a proper bearing and arranged within said upright tube; a rotatable armature fixed on said spindle as shown; the supporting-disk 15 arranged as shown on said posts and adapted to support the field-coils; the ring or band 13 arranged as described about said armature; the permanent retarding-magnets within said armature as described; and means for rigidly fixing the armature-spindle out of contact with the jewel-bearing, all substantially as described.

7. In a motor-meter, the combination of a revoluble metallic armature; a fixed metallic ring encircling said armature out of contact therewith and adapted to conduct the lines of magnetic force through said armature; and a permanent magnet or other source of magnetism arranged within said armature.

8. An electromagnetic drag consisting of a magnet, an annular magnetic conductor forming part of the magnetic circuit of said magnet, and a revoluble armature located within the field of force between said magnet and said conducting-ring and adapted to cut the lines of force of said field.

9. In a motor-meter, an electromagnetic drag consisting of an annular metallic conducting-ring, in combination with a revoluble cylinder of low resistance and inclosed by said ring; and a compound magnet or magnets within said revoluble armature as shown, having like poles terminating in a common pole-piece of iron, as described.

Signed by me, at Fort Wayne, State of Indiana, this 24th day of August, A. D. 1897.

THOMAS DUNCAN.

Witnesses:
EDWARD F. TIERNEY,
MAUDE X. RHOADES.